United States Patent [19]

Iwasaki

[11] 4,365,513
[45] Dec. 28, 1982

[54] DECELERATION SENSOR

[75] Inventor: Shinichiro Iwasaki, Auburn Heights, Mich.

[73] Assignee: Aisin Seiki Company, Limited, Aichi, Japan

[21] Appl. No.: 182,845

[22] Filed: Aug. 29, 1980

[51] Int. Cl.³ ............................................. G01P 15/11
[52] U.S. Cl. ..................................... 73/517 R; 336/30
[58] Field of Search ......................... 73/517 R, 517 B; 324/207, 208; 336/30, 110, 516 R

[56] References Cited

U.S. PATENT DOCUMENTS

| | | | |
|---|---|---|---|
| 2,979,959 | 4/1961 | Clurman | 73/516 R |
| 3,104,552 | 9/1963 | Bouchard | 73/497 |
| 3,113,464 | 12/1963 | Shulman | 73/517 R |
| 3,168,830 | 2/1965 | Chass | 73/517 R X |
| 3,281,743 | 10/1966 | Anderson | 336/30 |
| 3,483,759 | 12/1969 | Venetos et al. | 73/517 R |
| 3,855,528 | 12/1974 | Brown | 324/111 R |
| 3,877,314 | 4/1975 | Bernin | 73/517 B |
| 4,140,970 | 2/1979 | Blincoe | 324/208 |

FOREIGN PATENT DOCUMENTS 909023 10/1962 United Kingdom ............... 324/207

OTHER PUBLICATIONS

"Force and Displacement Transducers" from Electrical Engineering in Japan, vol. 99, No. 2, pp. 105-112, Feb. 1979 by Mohri et al.

Primary Examiner—James J. Gill
Attorney, Agent, or Firm—Oblon, Fisher, Spivak, McClelland & Maier

[57] ABSTRACT

A deceleration sensor comprising a magnetically soft core having an electrical coil wound thereon, a permanent magnet, a spring, and a ferromagnetic member adapted to be displaced against the action of the spring in response to deceleration to thereby change the magnetic flux acting on the magnetically soft core. A pulse voltage is applied to one end of the electrical coil and a corresponding voltage drop develops across a resistor connected to the other end of the coil with a delay corresponding to a deceleration. This delay may be represented in the form of an analog voltage or digital code.

39 Claims, 23 Drawing Figures

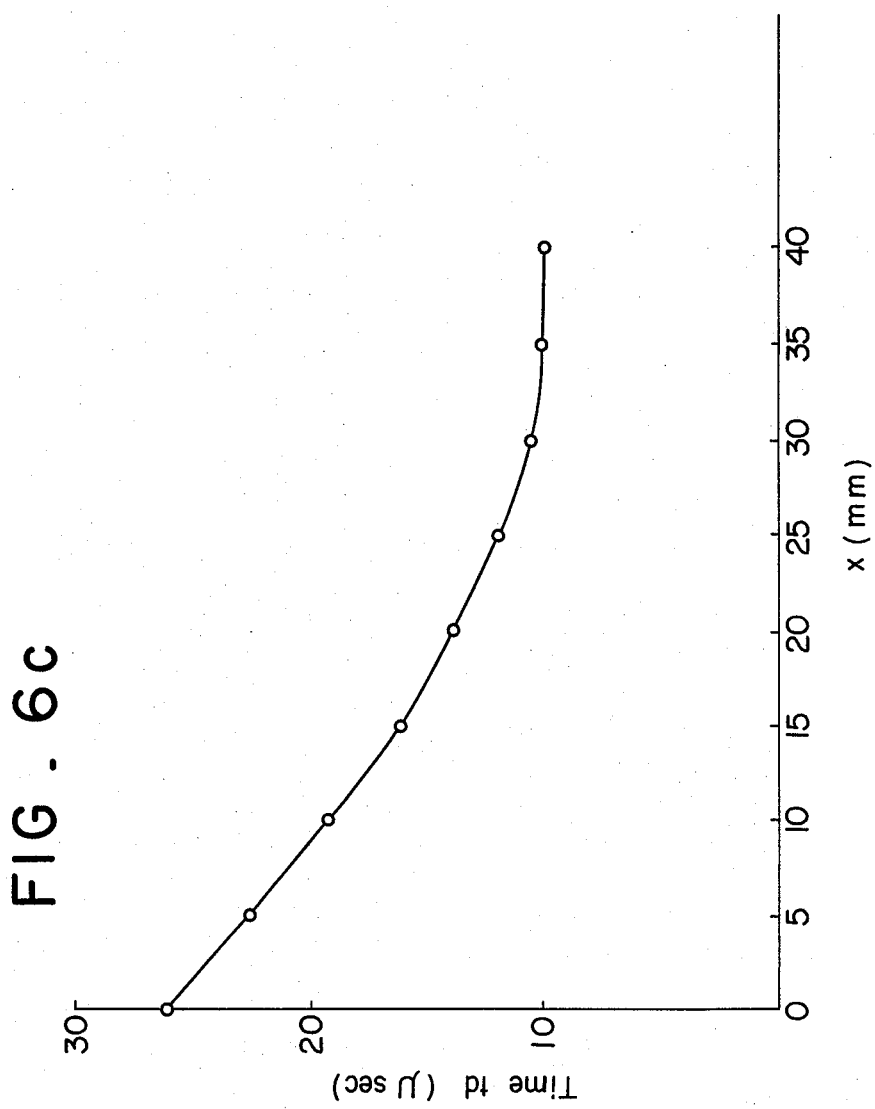

$Sx = S20 - S20'$ $Sx = S20 - S20'$

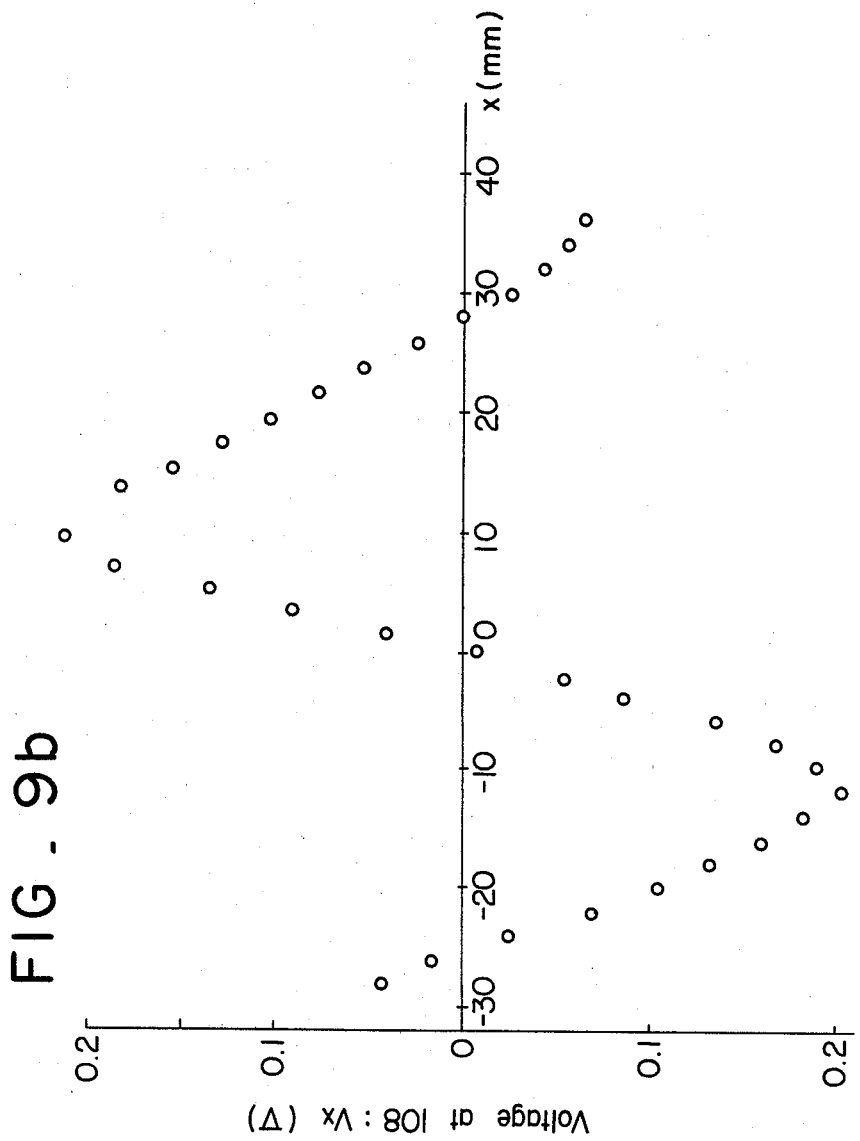

FIG_9c
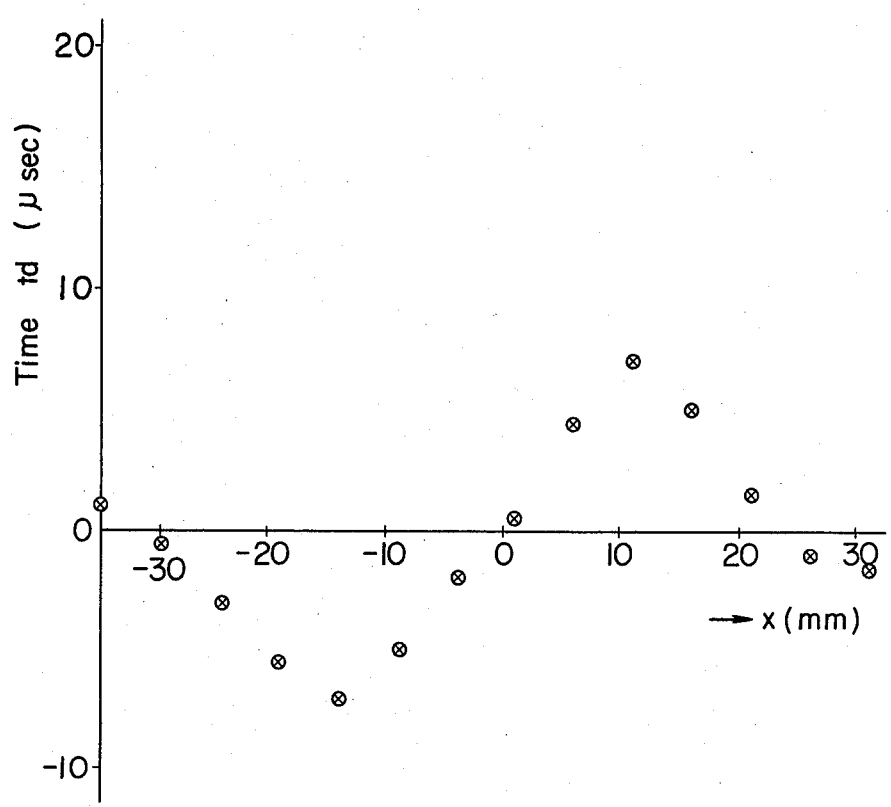

DECELERATION SENSOR

BACKGROUND OF THE INVENTION

1. Field of the Invention

This invention relates to a deceleration sensor which converts a deceleration signal into an electrical signal, and more particularly, to a deceleration sensor capable of converting the displacement of a movable member caused by deceleration into an electrical signal.

2. Description of the Prior Art

One type of prior art deceleration sensor uses a semiconductor strain gauge wherein a varying resistance corresponding to deceleration is converted into an analog voltage, providing a signal representative of deceleration. Such deceleration sensors, however, require comlicated circuitry to minimize noises because the electrical resistance varies a minor amount in accordance with deceleration. In addition, these sensors can only be used within a limited temperature range, from approximately −40° C. to approximately +100° C., because semiconductors are affected by temperature changes.

SUMMARY OF THE INVENTION

Therefore, it is a primary object of this invention to provide a deceleration sensor which produces deceleration-representing signals subject to relatively easy electrical processing.

Another object of this invention is to provide a deceleration sensor which is not susceptible to temperature changes and has sufficient mechanical strength and vibration resistance.

A further object of this invention is to provide a deceleration sensor which produces deceleration-representing date which can be read by advanced microcomputers or LSIs using relatively simple read logic.

According to one aspect of this invention, there is provided a deceleration sensor comprising a magnetically soft core having an electrical coil wound thereon, a permanent magnet for creating a magnetic flux, and a movable member of ferromagnetic material adapted to be displaced in response to deceleration to thereby change the magnetic flux acting on the magnetically soft core.

The magnetically soft core has a small cross-sectional area so that it is readily saturated magnetically. The electrical coil has a sufficient number of turns to magnetically saturate the magnetically soft core by applying a relatively low voltage or current across the coil. The permanent magnet may be small in dimension as long as it can produce a magnetic field of sufficient intensity to extend over the magnetically soft core. The magnetic field also passes through the ferromagnetic member which is displaceable so as to control the intensity of the magnetic field acting on the magnetically soft core.

A time T required to magnetically saturate the magnetically soft core from the start of application of voltage across the coil on the core is expressed by the following approximate equation:

$$T = \frac{N}{E}(\phi_m - \phi_x),$$

wherein E represents the voltage applied across the coil, N the number of turns in the coil, $\phi_m$ the maximum magnetic flux which is substantially equal to the saturated magnetic flux and $\phi_x$ a magnetic flux acting on the magnetically soft core via the ferromagnetic member. Time T depends on $\phi_x$ which changes as a function of displacement of the ferromagnetic member. Stated differently, the ferromagnetic member is displaced in response to deceleration, the magnetic flux $\phi_x$ acting on the magnetically soft core is changed accordingly, and then the time T for the coil current to reach a given level from the start of voltage application is changed. Accordingly, an electrical circuit or semiconductor electronic device may be connected to the deceleration sensor of the invention in order to determine the value of T and convert it into an electrical signal in the form of a voltage level or digital code.

In a preferred embodiment of the invention, the magnetically soft core may be made of an amorphous magnetic material. Since the amorphous magnetic material can be manufactured only by quenching a metal from liquid phase, it inevitably takes the form of a thin sheet. The material is ferromagnetic and has a high level of magnetic saturation, high permeability, and low level of coercive force while exhibiting a very high break strength and excellent resiliency and restoring force. These properties of amorphous materials make them very suitable for use in the sensor of this invention. Advantageously, the use of amorphous materials as electromagnetic coes not only ensures the provision of easily processable signals, but also increases the accuracy of the determination of the value of T. In addition, considering the mechanical aspects of this sensor, the manufacture of the sensor is simplified and the vibration or shock resistance thereof is improved.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 1b is a cross-sectional view taken along line 1b–1b of FIG. 1a;

FIG. 2b illustrates the waveforms of input and output signals of the processing circuit shown in FIG. 2a;

FIG. 3b illustrates the waveforms of input and output signals of the processing circuit shown in FIG. 3a;

FIG. 6b graphically illustrates the relationship of the voltage, indicative of a time lag, to the displacement of the movable ferromagnetic member, the voltage being measured using the arrangement shown in FIG. 6a wherein a 50 mm long ferromagnetic member is moved in the X—X direction and the electrical coil is connected to the electrical processing circuit shown in FIG. 2a;

FIG. 6c graphically illustrates the relationship of a time lag td ($\mu$sec) of a pulse rise to the displacement of the movable ferromagnetic member, the time lag being measured using the arrangement shown in FIG. 6a wherein a 50 mm long ferromagnetic member is moved in the X—X direction and the electrical coil is connected to the electrical processing circuit shown in FIG. 3a;

FIG. 7b is a cross-sectional view taken along line VIIb—VIIb of FIG. 7a;

FIG. 9b graphically illustrates the relationship of the voltage indicative of a time lag to the displacement of the movable ferromagnetic member, the voltage being measured using the arrangement shown in FIG. 9a wherein a 25 mm long ferromagnetic member is moved in the X—X direction, and a pair of electrical coils are spaced apart 50 mm and connected to the electrical processing circuit shown in FIG. 8a;

FIG. 9c graphically illustrates the relationship of the time lag td ($\mu$sec) of the pulse rise to the displacement of the movable ferromagnetic member, the time lag td ($\mu$sec) being measured using the arrangement shown in FIG. 9a wherein a 25 mm long ferromagnetic member is moved in the X—X direction, and a pair of electrical coils are spaced apart 50 mm and connected to the electrical processing circuit of FIG. 8b;

FIG. 10b is a cross-sectional view taken along line Xb—Xb of FIG. 10a;

FIG. 11b is a cross-sectional view taken along line XIb—XIb of FIG. 11a.

DETAILED DESCRIPTION OF THE PREFERRED EMBODIMENTS

Figure 1A:
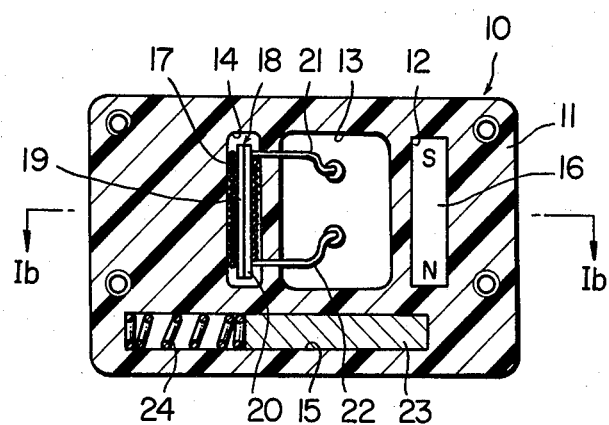
FIG. 1a is a longitudinal cross-sectional view illustrating a first embodiment of the deceleration sensor according to the invention.
Figure 1B:
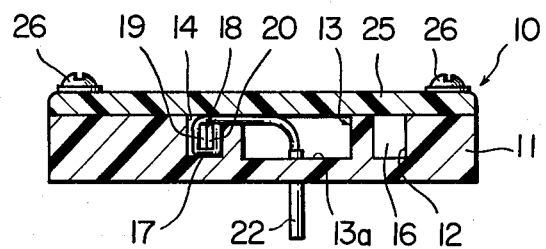

Referring to FIGS. 1a and 1b, a deceleration sensor 10 according to a first embodiment of the invention is shown as having a body 11 of synthetic resin. It should be noted that the body 11 is attached to a fixed portion of a vehicle (not shown) at a given angle with respect to the direction of movement of the vehicle. The body 11 is provided with a first slot 12, a recess 13, a second slot 14, and a third slot 15. The first slot 12, recess 13 and second slot 14 are juxtaposed in parallel and have their longitudinal axes extending perpendicular to the longitudinal axis of the body 11 while the third slot 15 has its longitudinal axis extending parallel to that of the body 11. The third slot 15 is located at the side of the lower walls of the juxtaposed first slot 12, recess 13 and second slot 14.

A permanent magnet 16 is located in the first slot 12 and is magnetized in the direction of its longitudinal axis. A core 18 is located in the second slot 14 and has an electrical coil 17 wound thereon. The core 18 extends parallel to the permanent magnet 16 and in this embodiment, consists of a support segment 19 of synthetic resin and another segment 20 of magnetically soft material bonded to the right surface of the support 19 with an adhesive. The opposite ends of the coil 17 are connected to lead wires 21 and 22 which extend through apertures in the bottom wall 13a of the recess 13 for external connection.

A movable member 23 of ferromagnetic material is received for sliding motion in the third slot 15 and is biased by a spring 24 to the right as shown in FIG. 1a. The movable member 23 has a longitudinal length substantially equal to the distance between the longitudinal axes of the permanent magnet 16 and magnetically soft core 20. The right and left ends of the movable member 23 are in substantial alignment with the longitudinal axes of the permanent magnet 16 and magnetically soft core 20, respectively. The movable member 23 is displaceable to the left against the action of the spring 24 when the vehicle on which the sensor is mounted decelerates. As the movable member 23 is displaced away from the permanent magnet 16, the magnetic flux created by the permanent magnet 16 and acting on the magnetically soft core 20 via the movable ferromagnetic member 23 decreases. This displacement of the movable member 23, which is proportional to either the magnitude of deceleration or a distance over which the movable member moves in response to deceleration, may be detected by any suitable electrical processing circuits or logical electronic devices.

Preferably, a cover 25 is secured to the top of the body 11 by means of screws 26 for the purpose of protecting the components during the use of the deceleration seensor 10 as shown in FIG. 1b.

A magnetically soft material exhibiting high permeability ($\mu_{max} > 10^3$) and low coercive force (<1.0 Oe) is used in this invention. Some magnetically soft materials are described in Hasegawa et al, "Soft Magnetic Properties of Metallic Glasses—Recent Developments", J. Appl. Phys.50(3), March, 1979, pp. 1551-1556.

Figure 2A:
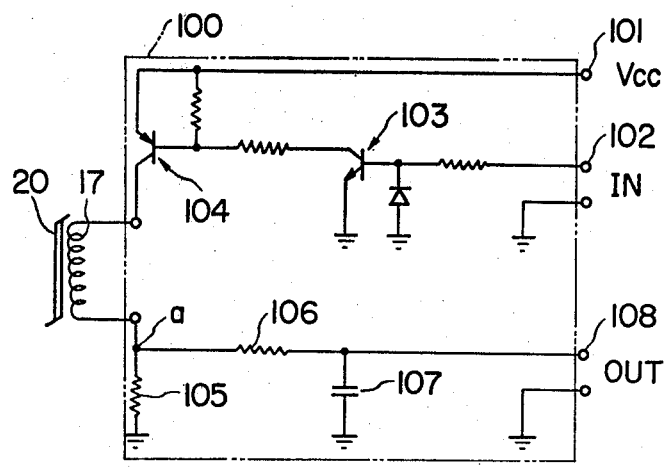
FIG. 2a is a circuit diagram of an electrical processing circuit connected to the deceleration sensor shown in FIGS. 1a and 1b for producing an analog voltage at a level corresponding to the deceleration detected.

FIG. 2a is a diagram of an electrical processing circuit 100. The circuit 100 includes a constant-voltage source terminal 101 connected to a given d.c. voltage source Vcc, for example, of the order of +5V. The circuit also includes an input terminal 102 to which a voltage pulse having a frequency of 5-25 kHz, for example, is applied. An NPN transistor 103 having its base connected to the terminal 102 is conductive during the time the pulse voltage remains positive, but nonconductive when the pulse voltage assumes a ground level. A PNP transistor 104 is turned on and off when the transistor 103 is turned on and off, respectively. Hence, the supply voltage Vcc is applied to the electrical coil 17 when the pulse voltage to the input terminal 102 remains positive, but is not applied when the pulse voltage is at the ground level. A voltage proportional to a current flow through the coil 17 develops across a resistor 105, and is integrated by an integrator consisting of a resistor 106 and a capacitor 107. The integrated voltage appears at an output terminal 108.

Figure 2B:
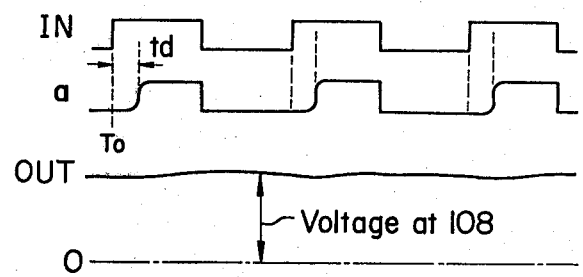

FIG. 2b graphically illustrates the waveforms of the input and output voltages of the circuit shown in FIG. 2a. The time lag td from the rising point $T_O$ of the input voltage (IN) to the point when the voltage (a) across the resistor 105 exceeds a given level and the integrated voltage Vx which represents an integral of the voltage (a) across the resistor 105, both depend on the displacement of the movable member 23.

Figure 3A:
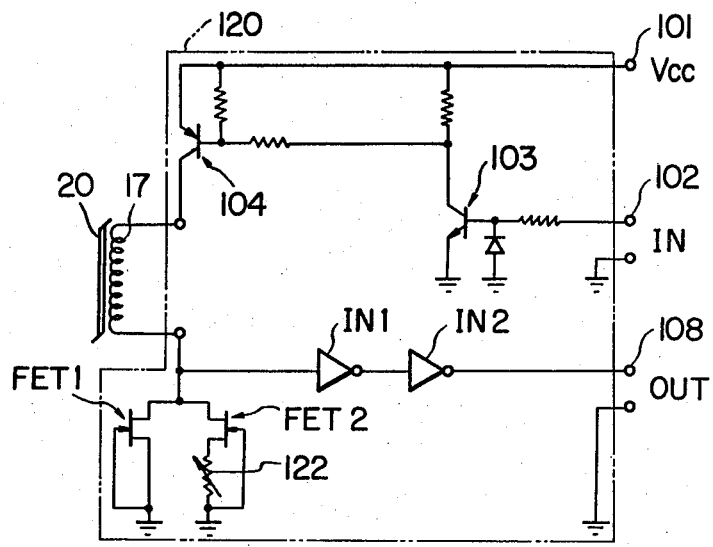
FIG. 3a is a circuit diagram of another electrical processing circuit connected to the deceleration sensor shown in FIGS. 1a and 1b for deriving a pulse indicative of a time lag corresponding to the deceleration detected.

FIG. 3a illustrates another electrical processing circuit 120. In this instance, NPN transistor 103 is turned on and a PNP transistor 104 is turned off when the input voltage (IN) remains positive. Thus, no voltage is applied to the (coil) 17. When the input voltage (IN) assumes the ground level, the transistor 103 is turned off and the PNP transistor 104 is turned on. A pair of junction N-channel field effect transistors FET 1 and FET 2 together form a constant-current source maintaining a constant current flow through the coil. The current level through FET 2 can be adjusted by means of a variable resistor 122. The voltage developed at the terminal of the coil which is connected to FET 1 and FET 2 is fed to a pair of cascade connected inverting amplifiers IN 1 and IN 2, which amplify and shape it.

Figure 3B:
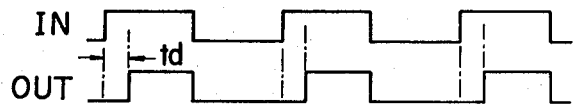

FIG. 3b graphically illustrates the waveforms of input and output voltages of the circuit of FIG. 3a. The circuit 120 produces an output voltage pulse (OUT) which rises with a time lag td with respect to an input pulse (IN). The time lag td depends on the displacement of the movable member 23.

Figure 4:
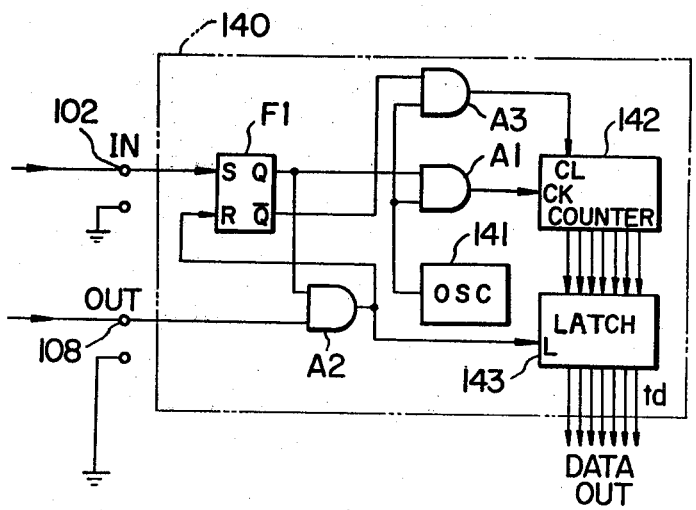
FIG. 4 is a block diagram of a counter circuit which converts the time lag between input and output pulses of the processing circuit of FIG. 3a into a digital code.

The magnitude of this time lag td may be converted into a digital code by a counter circuit 140 shown in FIG. 4. In the circuit 140, flip-flop F1 is set at the rising point of an input voltage (IN) and its Q output then changes to a high level or "1", which enables an AND gate A1 to pass pulses produced by a clock pulse oscillator 141 to a count pulse input CK of a counter 142. An output pulse (OUT) and the Q output of the flip-flop F1 are applied to an AND gate A2 which produces a high level signal or "1" when the output pulse (OUT) rises to a high level. At this point, the flip-flop F1 is reset, with its Q output reverting to a low level or "0". This disables the AND gate A1, and hence the supply of clock pulses to the counter 142 is interrupted. When the AND gate A2 produces a "1" output, a code indicative of the count in the counter 142 is stored in a latch 143. After the flip-flop F1 is reset and the latch 143 has been loaded with the count code, an AND gate A3 passes a clock pulse to clear the counter 142. An output code from the latch 143 indicates the number of clock pulses passed during the time interval of td and, hence, represents the magnitude of td.

Figure 5:
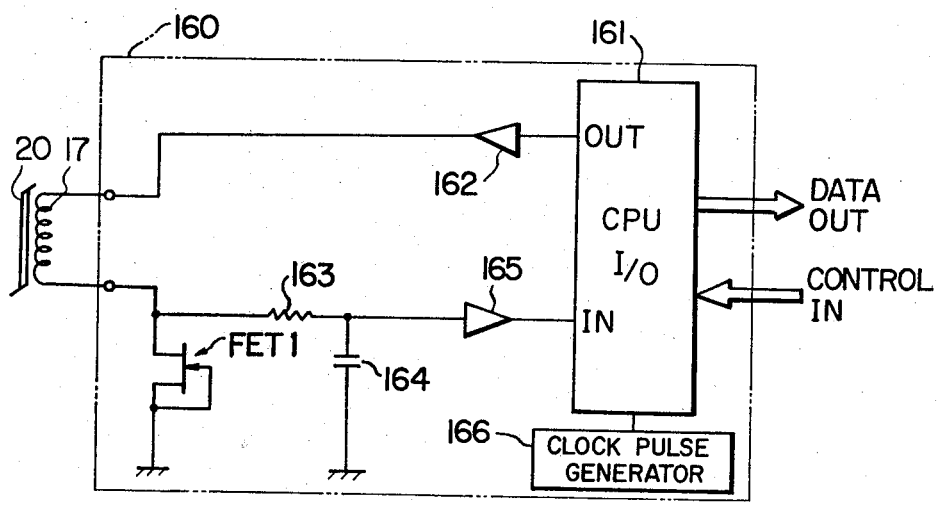
FIG. 5 is a block diagram of an electronic processing unit connected to the deceleration sensor shown in FIGS. 1a and 1b and including a single chip mocrocomputer for determining a time lag of the rising of current through an electrical coil of the deceleration sensor in response to an input pulse voltage applied thereto.

An electronic processing unit 160 shown in FIG. 5 comprises a single chip microcomputer (a large scale integrated semiconductor unit) 161, an amplifier 162, a junction N-channel field effect transistor FET 1 which acts as a constant-current source, a resistor 163, a capacitor 164, an amplifier 165 and a clock pulse oscillator 166. The combination of the resistor 163 and the capacitor 164 forms a filter which removes voltage oscillations at higher frequencies than the frequency of the input and the output pulse. The microcomputer 161 generates pulses at a given frequency in the range from 5 to 30 kHz on the basis of clock pulses to the amplifier 162. On the other hand, the microcomputer 161 monitors the voltage developed at the connection between the N-channel FET 1 and one end of the coil, or the output voltage of the amplifier 165, and counts the clock pulses which are passed during the time interval td from the rising of a pulse outputted by itself to the rising of the corresponding output voltage of the amplifier 165. The microcomputer forms an output code indicative of the time interval td (DATA OUT).

A combination of the deceleration sensor 10 shown in FIGS. 1a and 1b with the above-mentioned electrical processing circuit 100 or 120 provides an electrical signal corresponding to a deceleration. The movable member 23 of the deceleration sensor 10 is displaceable when the vehicle and, hence, the body 11 decelerates.

Figure 6A:
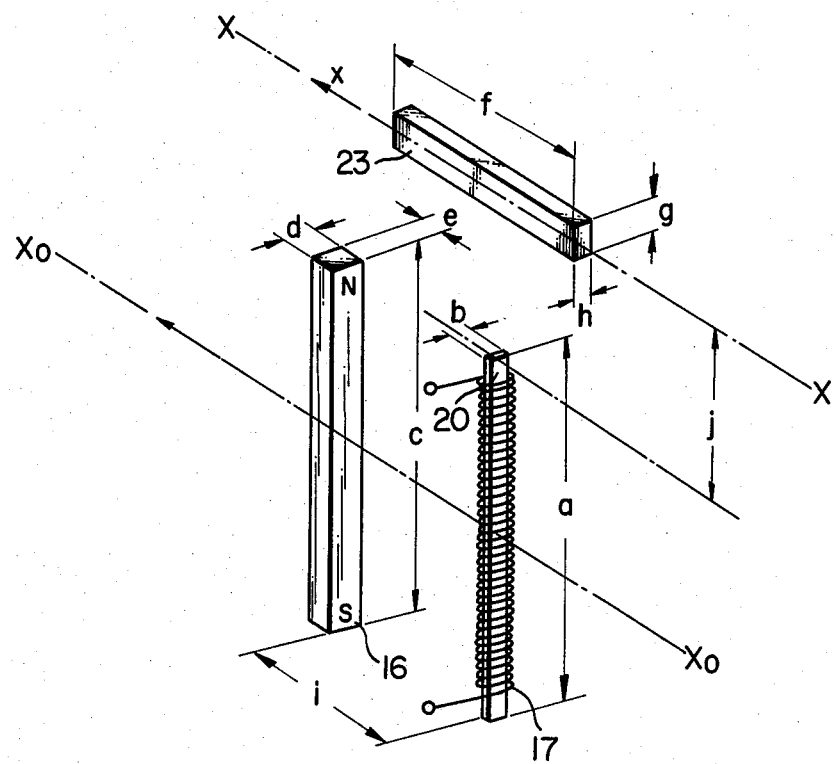
FIG. 6a is a perspective view illustrating an arrangement of a magnetically soft core, a permanent magnet and a movable ferromagnetic member, which arrangement is used to determine a time lag which varies in accordance with the displacement of the movable member relative to the magnetically soft core.

The conversion of the displacement signal of the movable member 23 into an electrical signal is described with reference to the experimental data shown in FIGS. 6a–6c. Referring to FIG. 6a, the magnetically soft core 20 and the permanent magnet 16 are fixed in parallel. An axis $X_O$—$X_O$ is perpendicular to both the longitudinal axes of the magnetically soft core 20 and permanent magnet 16. The movable member 23 of ferromagnetic material is movable along an axis X—X parallel to axis $X_O$—$X_O$ and spaced apart a given distance j from the top of the magnetically soft core 20. It is assumed that the movable member 23 is at the origin on axis X—X, or x=0, when the left end of the movable member 23 is in alignment with the longitudinal axis of the permanent magnet 16. (Parameter x is the distance of the movable member left end from the permanent magnet axis). Under these conditions, the time lag-representing voltage Vx and the time lag td (μs) are measured at a displacement x of the movable member 23 in direction X—X. The specific values of parameters a–j representing the dimensions and positions of the elements in FIG. 6a and the compositions of the elements are shown in Table 1 together with designation of the resultant curves.

TABLE 1

| | Soft magnetic core 20 | | | | Coil 17 | Permanent magnet 16 | | | Ferromagnetic member 23 | | |
|---|---|---|---|---|---|---|---|---|---|---|---|---|
| Case | Composition (% by atomic | Thickness | a | b | Number of laminated | Number of | c | d | e | Composition (% by atomic | f | g | h |

TABLE 1-continued

| No. | weight) | (mm) | (mm) | (mm) | sheets | turns | (mm) | (mm) | (mm) | weight) | (mm) | (mm) | (mm) |
|---|---|---|---|---|---|---|---|---|---|---|---|---|---|
| 1 | $Fe_{40}Ni_{40}P_{14}B_6$ amorphous | 0.058 | 40 | 1.8 | 4 | 10,000 | 40 | 5 | 5 | $Fe_{81}B_{13.5}Si_{3.5}C_2$ amorphous | 50 | 10 | 2 |
| 2 | $Fe_{40}Ni_{40}P_{14}B_6$ amorphous | " | " | " | " | " | " | " | " | $Fe_{81}B_{13.5}Si_{3.5}C_2$ amorphous | " | " | " |

Figure 6B:
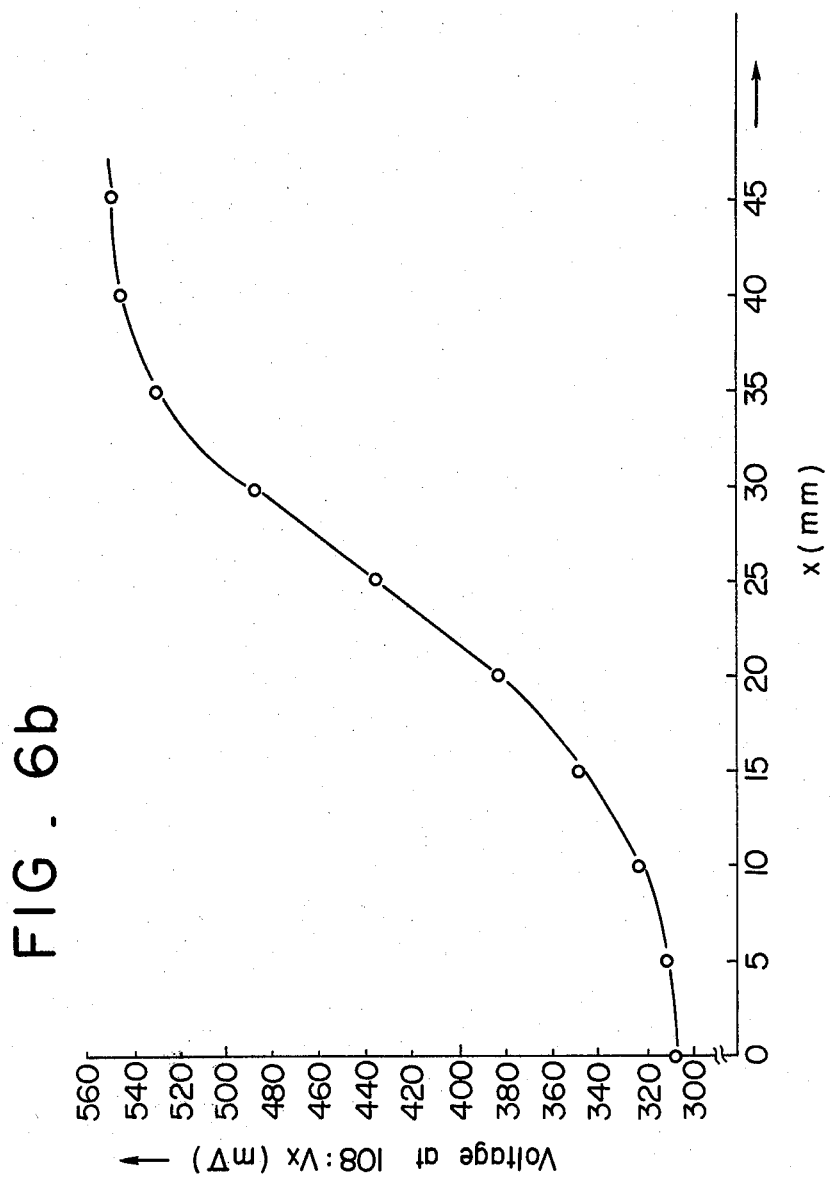

| Case No. | Spacing i (mm) | Spacing j (mm) | Measuring means and input pulse frequency | Voltage polarity* | Result |
|---|---|---|---|---|---|
| 1 | 40 | 2 | Circuit 100 5 kHz | N-N | FIG. 6b |
| 2 | " | " | Circuit 120 5 kHz | " | FIG. 6c |

"N—N" in the column involving voltage polarity means that the coil 17 is connected to the electrical processing circuit 100 or 120 such that an N-pole is produced at the upper end of the associated magnetically soft core 20.

The curve shown in FIG. 6b indicates that in case No. 1, voltage Vx having high linearity and accuracy is obtained for displacement x of the movable member 23 in the X—X direction within the range from 0 to 45 mm, preferably from 10 to 40 mm, more preferably from 20 to 35 mm. Similarly, the curve shown in FIG. 6c indicates that in case No. 2, time lag td (μs) having high linearity and accuracy is obtained for displacements x of the movable member 23 within the range from 0 to 45 mm, preferably from 0 to 30 mm, more preferably 0 to 15 mm.

As described above, an electrical signal can be obtained in proportion to displacement of the movable ferromagnetic member 23 of the deceleration sensor 10 shown in FIGS. 1a and 1b.

Figure 7A:
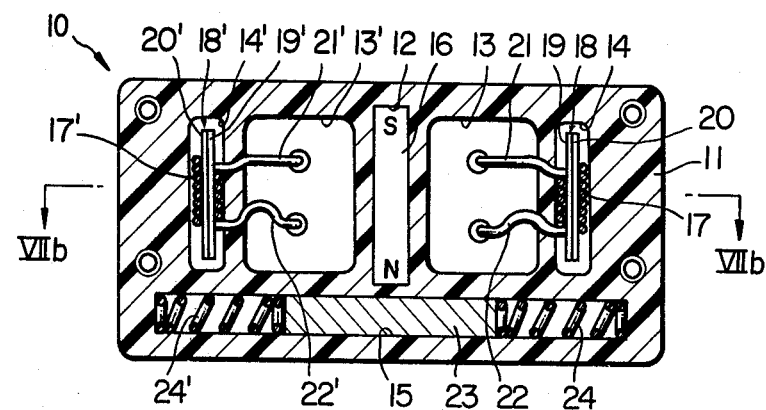
FIG. 7a is a longitudinal cross-sectional view of a second embodiment of the deceleration sensor according to the invention.
Figure 7B:
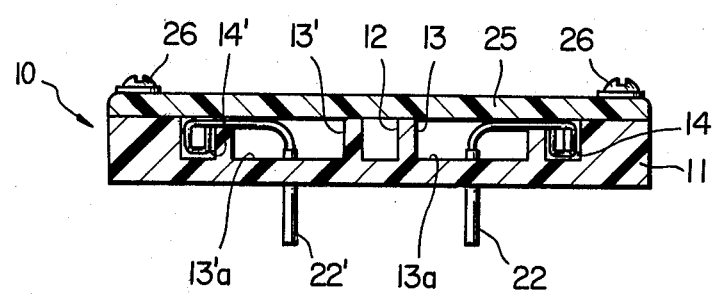

A second embodiment of the invention is shown in FIGS. 7a and 7b. A deceleration sensor 10 includes a body 11 which is provided with a first slot 12, a first recess 13, a second slot 14, a second recess 13', a fourth slot 14', and a third slot 15. These slots and recesses except the third slot are juxtaposed in parallel and have their longitudinal axes extending perpendicular to the longitudinal axis of the body 11 while the third slot has its longitudinal axis extending parallel to that of the body 11. The first and second recesses 13 and 13' are symmetrical with respect to the first slot 12 as well as the second and fourth slots 14 and 14'. The third slot 15 is located at the side of the lower walls of the juxtaposed first slot 12, first recess 13, second slot 14, second recess 13', and fourth slot 14'.

A rectangular permanent magnet 16 located in the first slot 12 is magnetized in the direction of its longitudinal axis. A core 18 is located in the second slot 14 and has an electrical coil wound thereon. The core 18 extends parallel to the permanent magnet 16 and consists of a support segment 19 of synthetic resin and a magnetically soft segment 20 bonded to the right surface of the support 19 with an adhesive. The opposite ends of the coil 17 are connected to lead wires 21 and 22 which extend through apertures in the bottom wall 13a of the first recess 13 for external connection. Similarly, a core 18' having an electrical coil 17' wound thereon is located in the fourth slot 14'. The core 18' extends parallel to the magnet 16 and consists of a synthetic resin segment 19' and a magnetically soft segment 20' bonded to the left surface of the segment 19' with an adhesive. The opposite ends of the coil 17' are connected to lead wires 21' and 22' which extend through apertures in the bottom wall 13a of the second recess 13' for external connection.

A movable member 23 of ferromagnetic material is fitted for sliding motion in the third slot 15. Between the right end of the movable member 23 and the right end wall of the third slot 15 is interposed a first spring 24 urging the member to the left. Between the left end of the movable member 23 and the left end wall of the third slot 15 is interposed a second spring 24' urging the member to the right. The first and second springs 24 and 24' are equal in size and resilience. The longitudinal center of the movable member 23 is in alignment with the longitudinal axis of the permanent magnet 16. When the vehicle decelerates, the movable member 23 displaces to the left against the action of the second spring 24'. This displacement of the movable member 23, proportional to the magnitude of deceleration, may be detected by a suitable electrical processing circuit or logical processing electronic device.

A cover 25 is secured to the top of the body 11 by means of screws 26 for the purpose of protecting the components.

Figure 8A:
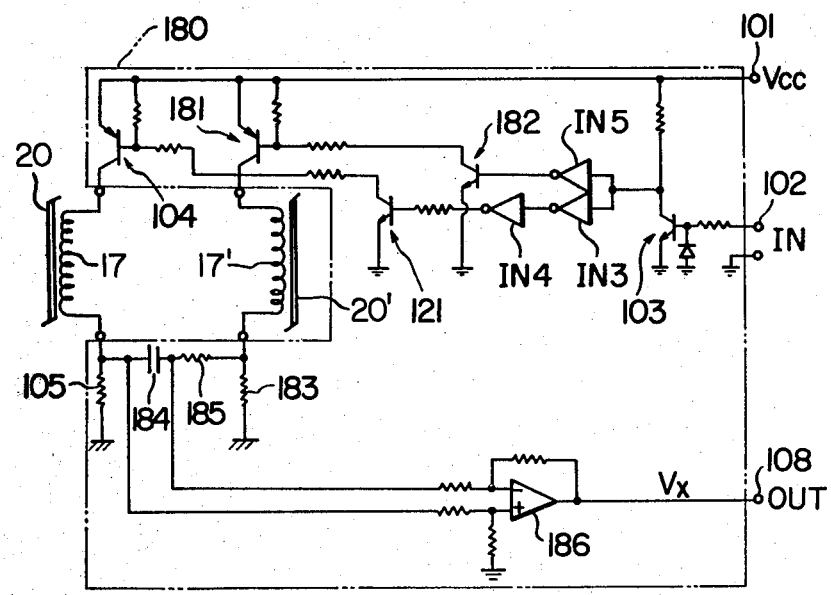
FIG. 8a is a circuit diagram of an electrical processing circuit connected to the deceleration sensor shown in FIGS. 7a and 7b for producing an analog voltage at a level corresponding to the deceleration detected.

FIG. 8a shows an electrical processing circuit 180 which produces an analog voltage Vx in accordance with the displacement of the movable ferromagnetic member 23 in the deceleration sensor 10 shown in FIGS. 7a and 7b. In the circuit 180, an NPN transistor 103 is turned on during the time an input voltage pulse (IN) remains positive and is turned off during the time the input voltage pulse assumes a ground level. The collector voltage of the transistor 103 is amplified and shaped by a pair of inverting amplifiers IN3 and IN4 before it is applied to the base of an NPN transistor 121. Thus, with the input voltage pulse (IN) at its positive level, the transistor 103 is turned on while the transistor 121 is turned off. Consequently, PNP transistor 104 is turned off during such time interval. The transistor 103 is off, the transistor 121 is on and the transistor 104 is on during the time the input voltage pulse assumes the ground level. In other words, a pulse voltage is applied to the coil 17 is a similar manner as in the circuit 120 of FIG. 3a, whereby a voltage pulse appears across a resistor 105 with a time lag td1 from the falling end of the input voltage pulse (IN) in accordance with the distance x₁ of the movable member 23 from the magnetically soft core.

A constant voltage is applied to the other electrical coil 17' through a PNP transistor 181. The transistor 181 is turned on during the time the input voltage pulse (IN) assumes its positive level. Transistor 103 is turned on to cause an inverting amplifier IN5 to produce a positive output which in turn turns an NPN transistor 182 on. The transistor 181 is turned off when the input voltage pulse (IN) assumes a ground level. As a result, a constant voltage is applied to the second coil 17' when no voltage is applied to the first coil 17, and no voltage is applied to the second coil when a voltage is applied to the first coil. Stated differently, the constant voltage is alternately applied to the first and the second coils 17, 17' in accordance with the input voltage pulse (IN).

The second coil 17' is connected to a resistor 183, across which a voltage pulse appears having a rising end which lags behind the rising end of the input voltage pulse (IN) by a time interval of td2 which depends on the distance $x_2$ of the movable member 23 from the magnetically soft core 20'. The voltage Vx1 developed across the resistor 105 is applied to one plate of a capacitor 184, while the voltage Vx2 developed across the resistor 183 is applied to the other plate of the capacitor 184. Since the distances between the movable member 23 and the first and second magnetically soft cores 20 and 20' are $x_1$ and $x_2$, wherein $x_1 + x_2 = k$ (constant), and Vx1 and Vx2 are proportional to $x_1$ and $x_2$, respectively, the potential difference across the capacitor 184 corresponds to $(x_1 - x_2)$.

The capacitor 184 forms an integrator together with a resistor 185, thus producing a voltage thereacross which corresponds to $(x_1 - x_2)$. Since $x_2 = k - x_1$, $x_1 - x_2 = 2x_1 + k$. Thus, the voltage across the capacitor 184 corresponds to $2x_1$. In other words, an analog voltage is obtained which corresponds to twice the travel $x_1$ of the movable member 23 as referenced to the first magnetically soft member 18. The opposite ends of the capacitor 184 are connected to inputs of an operational amplifier 186 which is designed as a differential amplifier. The amplifier 186 produces an analog output Vx which corresponds to $2x_1$.

Figure 8B:
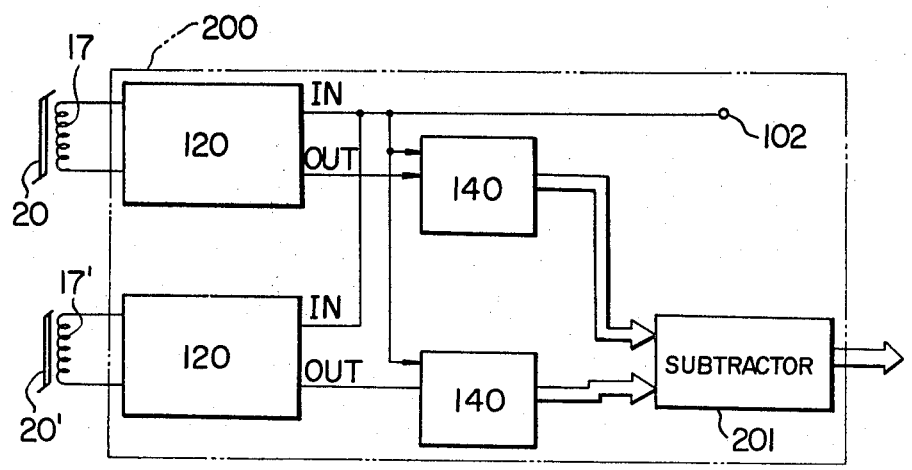
FIG. 8b is a block diagram of an electrical processing circuit connected to the deceleration sensor shown in FIGS. 7a and 7b for producing a digital code corresponding to the deceleration detected.

FIG. 8b shows another electrical processing circuit 200 which provides a pair of pulses which lag behind the rising end of the input pulse by time intervals of td1 and td2, respectively. These pulses are applied to a pair of counter circuits 140, respectively, where they are converted into a pair of codes S20 and S20' which represent the magnitudes of td1 and td2. These codes are applied to a subtractor 201, which calculates (td1−td2), producing a digital output Sx=S20−S20' which represents (td1−td2) or $2x_1$.

Figure 8C:
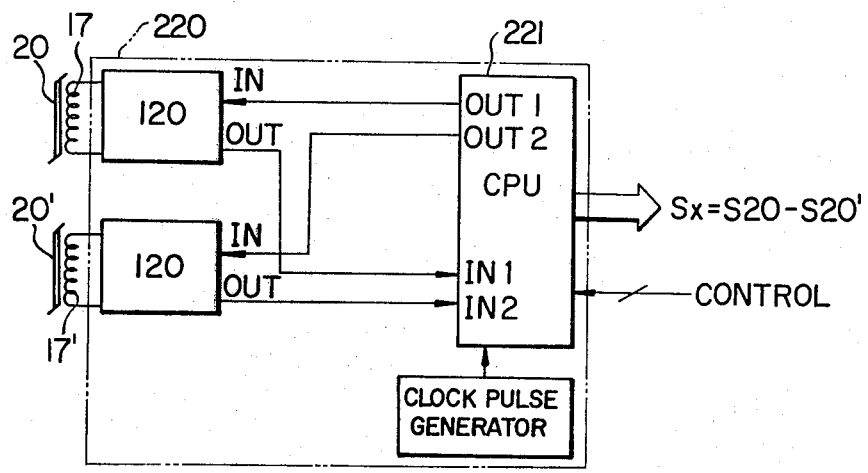
FIG. 8c is a block diagram of an electronic logical processing unit connected to the deceleration sensor shown in FIGS. 7a and 7b for producing a digital code corresponding to the deceleration detected.

FIG. 8c illustrates an electronic logical processing unit 220 including a single chip microcomputer 221 which applies a single pulse to the circuit 120 connected to the electrical coil 17 while initiating a time counting operation from the rising end thereof to obtain td1 count data S20, which is retained. Subsequently, the microcomputer applies a single pulse to the circuit 120 connected to the electrical coil 17' while initiating the time counting operation from the rising end therof to obtain td2 count data S20'. Then, the microcomputer calculates a difference (td1−td2) to produce a corresponding output code Sx=S20−S20'. As long as a measurement command signal is present, the microcomputer continues such operation.

Figure 9A:
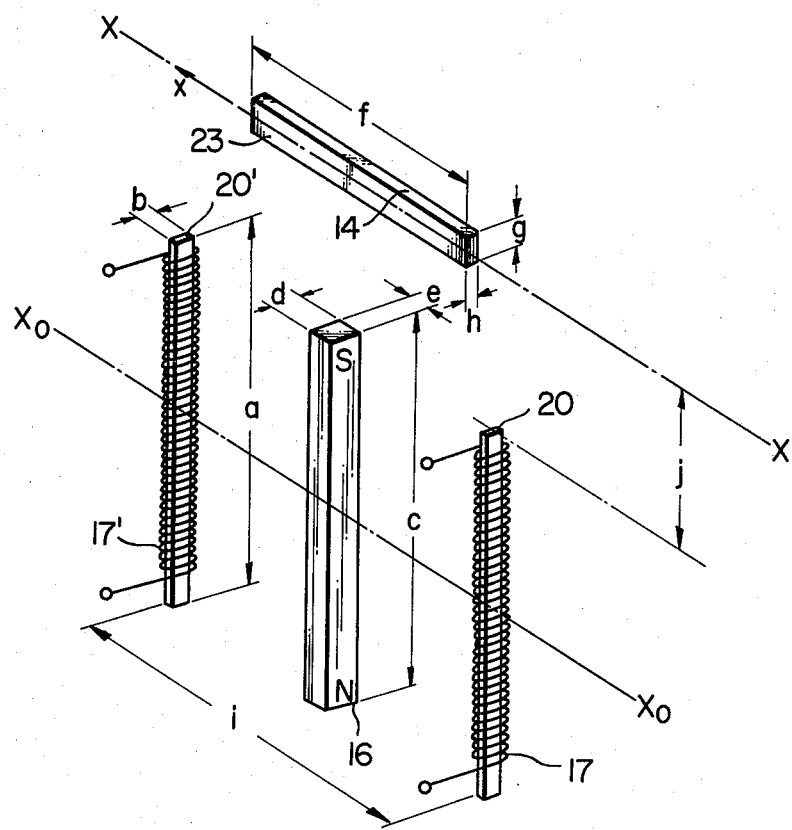
FIG. 9a is a perspective view illustrating an arrangement of a pair of soft magnetic cores, a permanent magnet and a movable ferromagnetic member, which arrangement is used to determine the difference between time lags associated with two electrical coils and varying in accordance with the displacement of the movable member relative to the cores.

The conversion of the displacement of the movable member 23 into an electrical signal will be described with reference to the experimental data shown in FIGS. 9a–9c. Referring to FIG. 9a, the magnetically soft cores 20 and 20' are parallel and the permanent magnet 16 is placed therebetween in a parallel relationship. An axis $X_O - X_O$ is perpendicular to the longitudinal axes of the magnetically soft cores 20, 20' and permanent magnet 16. The movable member 23 of ferromagnetic material is movable along an axis X—X which is parallel to axis $X_O - X_O$ and spaced apart a given distance j from the top of the magnetically soft cores 20, 20'. It is assumed that the movable member 23 is at the origin on axis X—X, or x=0, when the movable member 23 is centered between the magnetically soft cores 20 and 20'. Under these conditions, the time lag-representing voltage Vx and the time lag-representing time lag of pulse rise td (μs) are measured at a displacement x of the movable member 23 in the X—X direction. The specific values of parameters a–j representing the dimensions and positions of the elements and the compositions of the elements are shown in Table 2 together with the designation of the resultant figures.

TABLE 2

| Case No. | Soft magnetic cores 20, 20' | | | | | Coils 17, 17' | Permanent magnet 16 | | |
| | Composition (% by atomic weight) | Thickness (mm) | a (mm) | b (mm) | Number of laminated sheets | Number of turns | c (mm) | d (mm) | e (mm) |
| --- | --- | --- | --- | --- | --- | --- | --- | --- | --- |
| 3 | Fe40Ni40P14B6 amorphous | 0.05 | 40 | 5 | 4 | 800 | 40 | 5 | 5 |
| 4 | Fe40Ni40P14B6 amorphous | " | " | " | " | " | " | " | " |

| Case No. | Ferromagnetic member 23 | | | | Spacing | | Measuring means and input pulse frequency | Voltage polarity | Result |
| | Composition (% by atomic weight) | f (mm) | g (mm) | h (mm) | i (mm) | j (mm) | | | |
| --- | --- | --- | --- | --- | --- | --- | --- | --- | --- |
| 3 | Fe40Ni40P14B6 amorphous | 25 | 10 | 2 | 50 | 5 | Circuit 180 5 kHz | N-S | FIG. 9b |
| 4 | Fe40Ni40P14B6 amorphous | " | " | " | " | " | Circuit 200 5 kHz | N-N | FIG. 9c |

As is apparent from the experimental data shown in FIG. 9b, voltage Vx having high linearity and accuracy is obtained for displacements x of the movable ferromagnetic member 23 in the X—X direction within the range from −10 to +10 mm, or from −30 to −21 mm, or from +10 to +30 mm.

The experimental data shown in FIG. 9c are obtained by connecting two electrical processing circuits 120 of FIG. 3a to the electrical coils 17 and 17' as shown in FIG. 8b and measuring the time lag td (μs). The time lag td has high linearity and accuracy is obtained for displacements x of the movable ferromagnetic member 23 in the X—X direction within the range from −30 to −16 mm, from −16 to +10 mm, or from +10 to +26 mm.

In the embodiments described above, the sensor is designed so that the movable ferromagnetic member is displaced in response to deceleration to thereby change the magnetic flux created by the permanent magnet and acting on the magnetically soft core via the movable member. It is also possible to place a movable ferromagnetic member so as to shield a magnetically soft core. The movable member is displaced away from the core in response to deceleration to thereby increase the magnetic flux acting on the magnetically soft core.

Figure 10A:
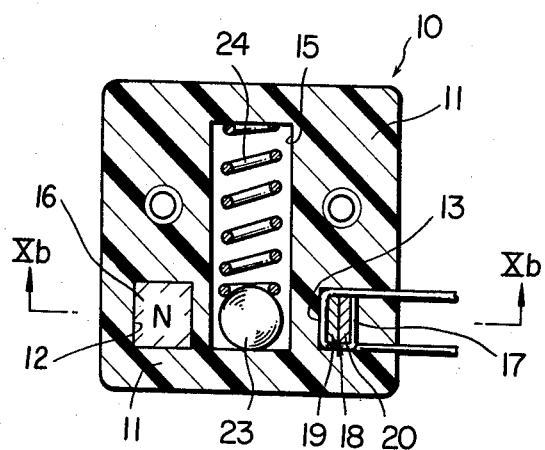
FIG. 10a is a longitudinal cross-sectional view of a third embodiment of the deceleration sensor according to the invention.
Figure 10B:
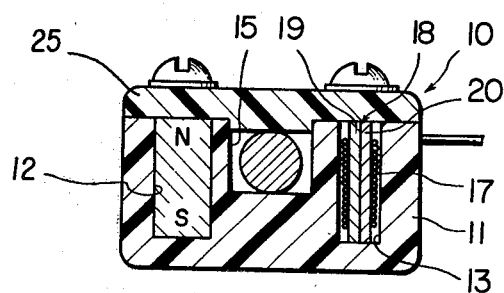

In a third embodiment of this invention shown in FIGS. 10a and 10b, a deceleration sensor 10 includes a body 11 which is provided with first, second and third grooves 12, 13 and 15. A permanent magnet 16 is located in the first groove 12. A core 18 is located in the second groove 13 and has an electrical coil 17 wound thereon. The core 18 consists of a support 19 and a magnetically soft segment 20 adhered to the right surface of the support. A movable member 23 of ferromagnetic material is placed in the third groove 15 and urged by a spring 24 to a position intermediate the magnet 16 and the core 18. The movable member 23 is of a spherical shape in this example. The movable member 23 forms a magnetic shield reducing the magnetic flux acting on the magnetically soft core 20.

The sensor is set on a vehicle such that the movable member 23 will be displaced away from the magnetically soft core 20 against the action of the spring 24 when the vehicle decelerates. The direction of displacement of the movable member 23 is perpendicular to a plane containing the longitudinal axes of the magnet 16 and magnetically soft core 20 or upward in FIG. 10a. The displacement of the movable member 23 away from said plane due to deceleration allows more magnetic flux to act on the magnetically soft core 20. Then, the increment of the magnetic flux is proportional to the displacement of the movable member which, in turn, is proportional to the magnitude of deceleration. This means that the magnitude of deceleration can be determined by detecting the increment of magnetic flux in the form of an electrical signal.

A cover 25 is secured to the top of the body 11 by means of screws 26 for the purpose of protecting the components.

Figure 11A:
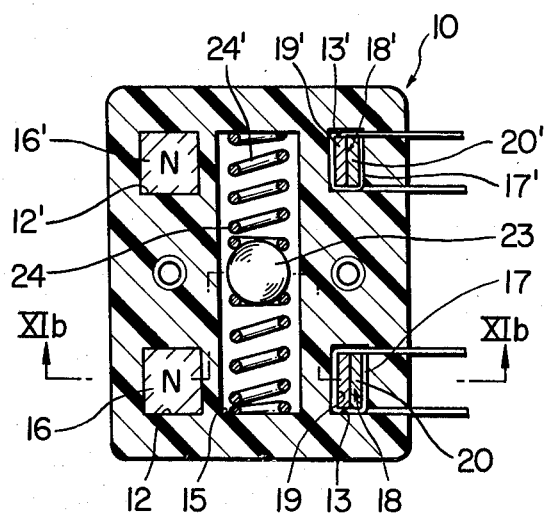
FIG. 11a is a longitudinal cross-sectional view of a fourth embodiment of the deceleration sensor according to the invention.
Figure 11B:
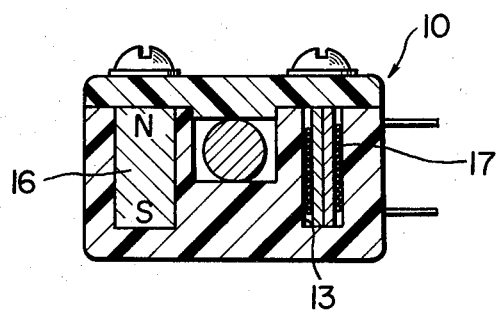

In a fourth embodiment shown in FIGS. 11a and 11b, a deceleration sensor 10 includes a body 11 which is provided with a first, second, third, fourth and fifth grooves 12, 13, 15, 12' and 13'. Permanent magnets 16 and 16' are located in the first and fourth grooves 12 and 12'. A core 18 is located in the second groove 13 and consists of a support 19 and a magnetically soft segment 20 adhered to the right surface of the support and having an electrical coil 17 wound thereon.

A core 18' in the fifth groove 13' consists of a support 19' and a magnetically soft segment 20' adhered to the left surface of the support and having an electrical coil 17' wound thereon. A movable member 23 of ferromagnetic material and having a spherical shape is in the third groove 15. The movable member 23 is interposed between two equivalent springs 24 and 24' so that it will be displaced against the action of the spring 24' under the influence of deceleration. A plane containing the longitudinal axes of the magnet 16 and magnetically soft core 20 is parallel to a plane containing those of the magnet 16' and magnetically soft core 20'. The member 23 is allowed to move perpendicular to these planes.

In the first to fourth embodiments described above, the magnetically soft core segments 20 and 20' consist of a plurality of sheets of amorphous magnetic material laminated one on top of the other. The amorphous magnetic material is very advantageous for use in this invention because of high permeability, high resilience and good deformation resistance. Other magnetic materials may also be used, for example, super Permalloy $Ni_{80}Fe_{20}$ and Mumetal $Ni_{80}Fe_{16}Mo_4$.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A deceleration sensor comprising:
   magnetically soft core means having an electrical coil wound thereon,
   permanent magnet means for creating a magnetic flux,
   spring means,
   a movable ferromagnetic member normally biased by said spring means and adapted to be displaced against said spring means in response to deceleration to thereby change the magnetic flux acting on said magnetically soft core means, and
   detection means for applying a predetermined pulse voltage to said electric coil to saturate said core means and for detecting changes in the external magnetic field strength provided by said permanent magnet means acting on said magnetically soft core means according to changes in the relative position of said ferromagnetic material member, comprising means for producing an output signal indicative of the deceleration based on the time between application of said pulse voltage and saturation of said core means.

2. A deceleration sensor according to Claim 1, wherein said detection means comprises:
   constant current means coupled to said electrical coil for producing a constant current through said coil upon application as said pulse voltage to said coil to saturate said core means.

3. A deceleration sensor according to claim 1 wherein the magnetic flux acting on said magnetically soft core means also passes through said movable ferromagnetic member.

4. A deceleration sensor according to claim 3 wherein said magnetically soft core means, permanent magnet means, and spring means comprise one magnetically soft core, one permanent magnet, and one spring, respectively.

5. A deceleration sensor according to claim 4 wherein said permanent magnet faces said magnetically soft core.

6. A deceleration sensor according to claim 5 wherein said permanent magnet is magnetized in the direction of its longitudinal axis which axis is parallel to that of said magnetically soft core.

7. A deceleration sensor according to claim 6 wherein said movable ferromagnetic member is displaceable away from permanent magnet in response to deceleration.

8. A deceleration sensor according to claim 7 wherein said movable ferromagnetic member is disposed so that the longitudinal axis thereof is perpendicular to that of said permanent magnet.

9. A deceleration sensor according to claim 8 wherein said movable ferromagnetic member has a longitudinal length substantially equal to the distance between the longitudinal axes of said permanent magnet and said magnetically soft core.

10. A deceleration sensor according to claim 9 wherein said spring abuts one end of said movable ferromagnetic member which is in alignment with the longitudinal axis of said magnetically soft core.

11. A deceleration sensor according to claim 10 wherein said magnetically soft core is of an amorphous magnetic material.

12. A deceleration sensor according to claim 3 wherein said magnetically soft core means, permanent magnet means, and spring means comprise two magnetically soft cores, one permanent magnet, and two springs, respectively.

13. A deceleration sensor according to claim 12 wherein said permanent magnet is disposed between the two opposing magnetically soft cores.

14. A deceleration sensor according to claim 13 wherein said permanent magnet is magnetized in the direction of its longitudinal axis which is parallel to those of the two magnetically soft cores.

15. A deceleration sensor according to claim 14 wherein said two magnetically soft cores are symmetrical with respect to the longitudinal axis of said permanent magnet.

16. A deceleration sensor according to claim 15 wherein said movable ferromagnetic member is interposed between the two springs and is displaceable toward one magnetically soft core and away from the other magnetically soft core against the action of one of said two springs.

17. A deceleration sensor according to claim 16 wherein said movable ferromagnetic member is disposed so that the longitudinal axis therof is perpendicular to that of said permanent magnet.

18. A deceleration sensor according to claim 17 wherein the longitudinal center of said movable ferromagnetic member is in alignment with the longitudinal axis of said permanent magnet.

19. A deceleration sensor according to claim 18 wherein said two magnetically soft cores are of an amorphous magnetic material.

20. A deceleration sensor according to claim 3 wherein said magnetically soft core means, permanent magnet means, and spring means comprise one magnetically soft core, one permanent magnet, and one spring, respectively.

21. A deceleration sensor according to claim 20 wherein said permanent magnet faces said magnetically soft core.

22. A deceleration sensor according to claim 21 wherein said permanent magnet is magnetized in the direction of its longitudinal axis which is parallel to that of said magnetically soft core.

23. A deceleration sensor according to claim 22 wherein said movable ferromagnetic member is displaceable away from both said permanent magnet and said magnetically soft core in response to deceleration.

24. A deceleration sensor according to claim 23 wherein said movable ferromagnetic member is displaceable perpendicular to a plane containing the longitudinal axes of said permanent magnet and said magnetically soft core.

25. A deceleration sensor according to claim 24 wherein said movable ferromagnetic member is of a spherical shape.

26. A deceleration sensor according to claim 25 wherein said magnetically soft core is of an amorphous magnetic material.

27. A deceleration sensor according to claim 3 wherein said magnetically soft core means, permanent magnet means, and spring means comprise two magnetically soft cores, two permanent magents, and two springs, respectively.

28. A deceleration sensor according to claim 27 wherein one magnetically soft core faces one permanent magnet and the other magnetically soft core faces the other permanent magnet.

29. A deceleration sensor according to claim 28 wherein said one and said other permanent magnets are magnetized in the direction of their longitudinal axes which are parallel to those of the opposing magnetically soft cores.

30. a deceleration sensor according to claim 29 wherein said movable ferromagnetic member is interposed between said two springs and is displaceable toward one permanent magnet and one magnetically soft core and away from the other permanent magnet and the other magnetically soft core against the action of one of said two springs.

31. A deceleration sensor according to claim 30 wherein a plane containing the longitudinal axes of one permanent magnet and magnetically soft core is parallel to a plane containing the longitudinal axes of the other permanent magnet and magnetically soft core.

32. A deceleration sensor according to claim 31 wherein said movable ferromagnetic member is displaceable perpendicular to a plane containing the longitudinal axes of one permanent magnet and one magnetically soft core.

33. A deceleration sensor according to claim 32 wherein said movable ferromagnetic member is of a spherical shape.

34. A deceleration sensor according to claim 33 wherein said magnetically soft core is of an amorphous magnetic material.

35. A deceleration sensor comprising:
magnetically soft core means having an electrical coil wound thereon,
permanent magnet means for creating a magnetic flux;
spring means; and
a movable ferromagnetic member normally biased by said spring means and adapted to be displaced against said spring means in response to deceleration to thereby change the magnetic flux acting on said magnetically soft core means;
wherein the magnetic flux acting on said magnetically soft core means also passes through said movable ferromagnetic member, said magnetically soft core means at least partially shielded by said movable ferromagnetic member;
wherein said magnetically soft core means, permanent magnetic means, and spring means comprise two magnetically soft cores, two permanent magnets, and two springs, respectively wherein one magnetically soft core faces one permanent magnet and the other magnetically soft core faces the other permanent magnet.

36. A deceleration sensor according to claim 35 wherein said one and said other permanent magnets are magnetized in the direction of their longitudinal axes which are parallel to those of the opposing magnetically soft core.

37. A deceleration sensor according to claim 36 wherein said movable ferromagnetic member is interposed between said two springs and is displaceable toward one permanent magnet and one magnetically soft core and away from the other permanent magnet and the other magnetically soft core against the action of one of said two springs.

38. A deceleration sensor according to claim 37 wherein a plane containing the longitudinal axes of one permanent magnet and magnetically soft core is parallel to a plane containing the longitudinal axes of the other permanent magent and magnetically soft core.

39. A deceleration sensor according to claim 38 wherein said movable ferromagnetic member is displaceable perpendicular to a plane containing the longitudinal axes of one permanent magnet and one magnetically soft core.

* * * * *

UNITED STATES PATENT AND TRADEMARK OFFICE
CERTIFICATE OF CORRECTION

PATENT NO. : 4,365,513

DATED : December 28, 1982

INVENTOR(S) : SHINICHIRO IWASAKI

It is certified that error appears in the above-identified patent and that said Letters Patent is hereby corrected as shown below:

Column 1 line 17 delete "comlicated" and substitute --complicated--.
Column 1 line 36 delete "date" and substitute --data--.
Column 2 line 27 delete "coes" and substitute --cores--.
Column 2 line 65 delete "mocrocom-" and substitute --microcom---.
Column 8 line 56 delete "is" and substitute --in--.
Column 9 line 61 after "output" insert --code--.
Column 10, line 3 delete "therof" and substitute --thereof--.
Column 10, line 56 delete "21 mm" and substitute --12 mm--.
Column 12, line 36 delete "Claim" and substitute --claim--.
Column 13, line 35 delete "therof" and substitute --thereof--.
Column 14, line 7 delete "magents" and substitute --magnets--.
Column 14, line 18 delete "a" and substitute --A--.
Column 16, line 3 delete "magent" and substitute --magnet--.

Signed and Sealed this

Fifth Day of April 1983

[SEAL]

Attest:

GERALD J. MOSSINGHOFF

Attesting Officer    Commissioner of Patents and Trademarks